Sept. 22, 1959 SVEN-OLOF KARLSSON ET AL 2,905,025
HYDRAULIC CHANGE SPEED GEARINGS
Filed March 10, 1953 2 Sheets-Sheet 1

INVENTORS
Sven-Olof Karlsson
Erik Viuff Quistgaard

BY Pierce, Schiffler & Parker
ATTORNEYS

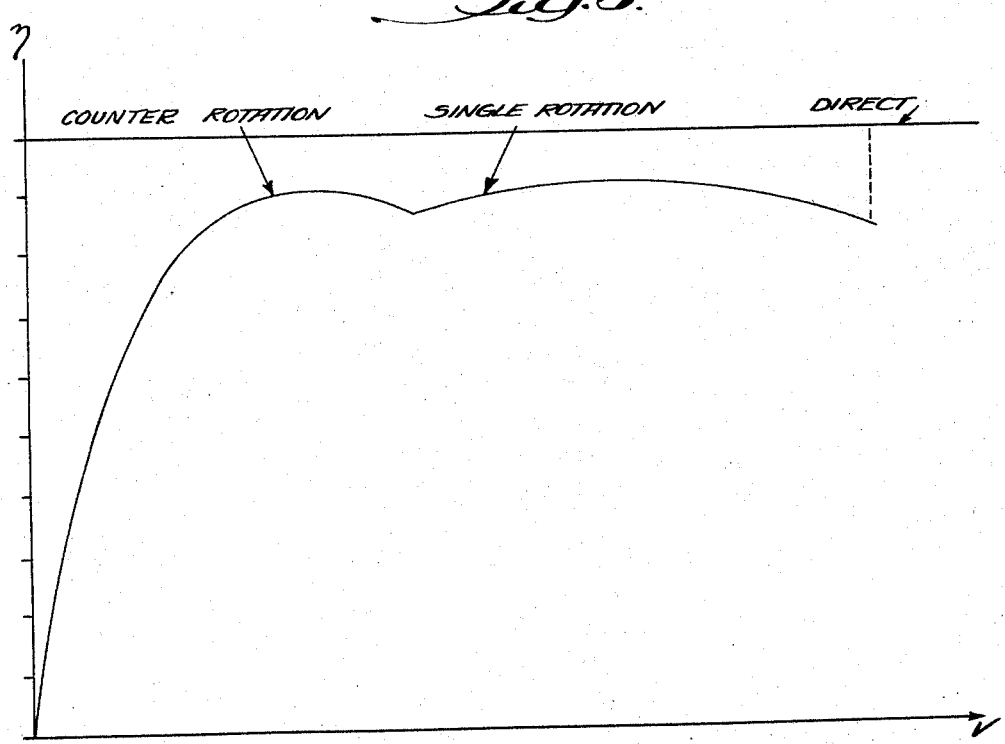

United States Patent Office 2,905,025
Patented Sept. 22, 1959

2,905,025

HYDRAULIC CHANGE SPEED GEARINGS

Sven-Olof Karlsson and Erik Viuff Quistgaard, Gothenburg, Sweden, assignors to Aktiebolaget Volvo, Gothenburg, Sweden, a corporation of Sweden Application March 10, 1953, Serial No. 341,422

Claims priority, application Sweden March 10, 1952

3 Claims. (Cl. 74—677)

The present invention refers to change speed gearings for motor vehicles comprising a hydraulic torque converter, the turbine of which is adapted for counter-rotation, that is, in which a turbine member and a guide member are adapted to rotate in opposite directions as distinguished from a single rotation converter in which the guide member is stationary, and the two output shafts of which are connected to a planet gearing, besides which braking and/or locking means are provided to enable the transmission of torques alternatively under counter or single rotation conditions. In order also to provide facilities in such gearings for backward drive, one would previously resort to relatively complicated transmission and coupling means. The invention has for its object, by simple means, to provide a change speed gearing adapted both for counter and single rotation while also making rearward drive possible.

Figure 1:
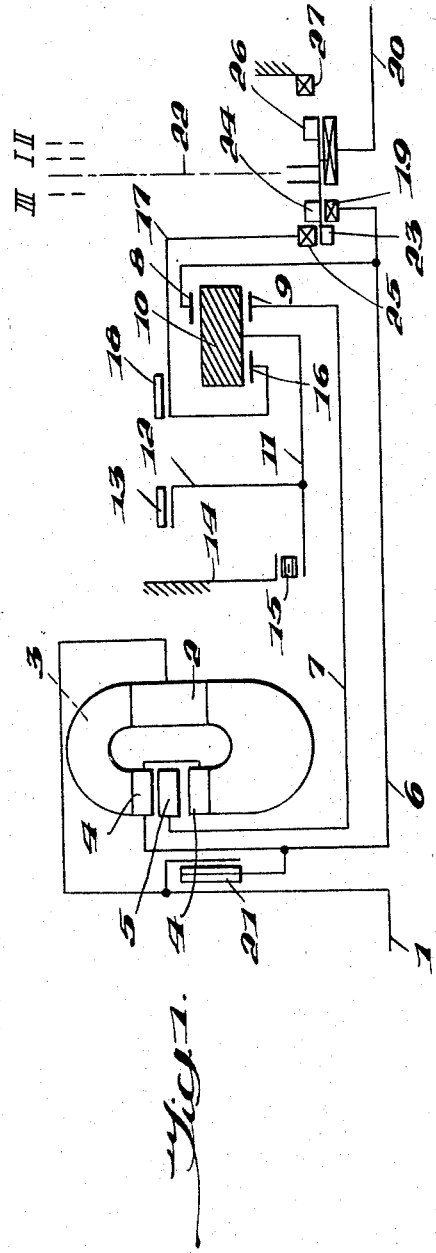
Figure 2:
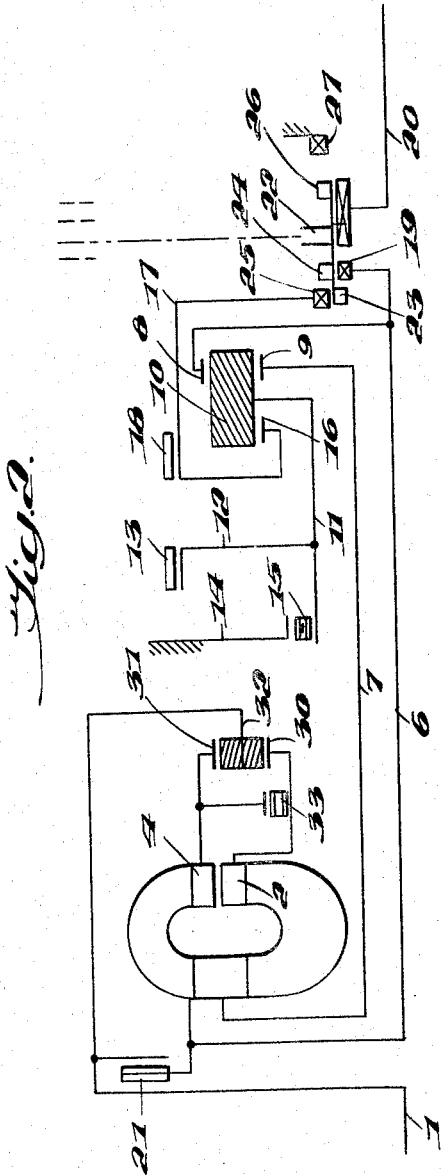

The invention will be explained more closely in the following with reference to the accompanying drawings which illustrate a few embodiments of the same by way of diagrammatic representation. Figs. 1 and 2 are diagrammatic views of two different plants differing from each other with respect to the arrangement in connection with the input shaft of the gearing. Fig. 3 represents a diagram illustrating the variation of the efficiency in dependence on the speed in connection with three different ratios of gear.

In Fig. 1, 1 designates an input shaft connected to the motor of a vehicle, said shaft being connected to a pump wheel, the blades of which are denoted by 2. The pump wheel is part of a hydraulic torque converter 3 provided with a two-stage turbine 4 having a rim of guide blades 5 arranged between the turbine stages. The turbine 4 is connected to a shaft 6, the guide blade rim 5 being also carried by a rotatable shaft 7, so that the turbine forms a so-called counter rotation turbine.

The shafts 6 and 7 are connected to a ring wheel 8 and a sun wheel 9 in a planet gearing, the planet wheels of which are designated by 10. The planet wheels 10 are carried in known manner by a rotatable planet wheel holder, which is supported by a shaft 11. Secured to the latter is a drum 12 cooperating with a brake band 13 adapted to be tightened. Furthermore, a roller locking device 15 is arranged between the shaft 11 and the housing of the change speed gearing, said housing being indicated in Fig. 1 as a fixed support 14.

The planet wheels 10 are of a length exceeding the width of the wheels 8 and 9, and engaging the planet wheels is a further sun wheel 16 having tthe same number of teeth as the sun wheel 9 and being carried by a drum 17 or similar construction surrounding the planet gearing. A brake band 18, adapted to be tightened, cooperates with the drum 17.

The arrangement described above functions in the following manner:

When the vehicle is started for forward drive, the brake bands 13 and 18 being disconnected, the torque from the input shaft 1 will be transmitted over the hydraulic torque converter to the shafts 6 and 7 rotating in opposite directions. The torque from the shaft 7 is transmitted over the planet wheels 10 to the shaft 6, the reactive torque on the planet wheel holder being then taken up by the roller locking device 15. Here, the shaft 6 forms the output shaft of the change speed gearing,, the torque at forward drive being transmitted over a diagrammatically indicated claw coupling 19 to the driving shaft 20 of the vehicle.

At the start, a relatively great value of the ratio between the input and output torques will be obtained by reason of the double rotation, said ratio varying, for instance, between the values 7.0 and 2.0 at an increase of the speed from 0 to 35 kilometers per hour. At the latter speed, the brake band 18 may be pulled tight, the shafe 7 carrying the guide blade rim 5 being then locked at the same time since the sun gears 16 and 9 are then prevented from rotation. The turbine will now operate as a single rotation turbine, and the step-up change of the torque may be conceived of as varying between 2.0–1.0 at an increase of the speed from 35 to 75 kilometers per hour. After that, the input shaft 1 and the output shaft 6 are directly connected to each other by means of a diagrammatically indicated laminated coupling 21, without any step-up change of the torque, the brake band 18 being then in a loosened state.

In Fig. 1, 22 designates a diagrammatically indicated operating member for the coupling 19, by means of which the shaft 6 may be connected to the shaft 20. In the figure, the operating member 22 takes its neutral position, but may, in addition, take three further positions denoted by I, II and III. In the position I, a claw member 23 cooperates with the claw coupling 19 on the shaft 6. On the other hand, if the operating member 22 is moved to the position III, a further claw member 24 will cooperate with a coupling member 25 on the drum 17 carrying the sun wheel 16. If the brake band 13 is pulled tight, so that the shaft 11 is stationary, the drum 17 will rotate in the same direction as the guide blade rim 5, since both sun gears 16 and 9 are in engagement with the planet gears 10, from which it will be understood that in the position III of the operating member 22 the shaft 20 will be driven for backward drive under counter rotation conditions.

In the position II of the operating member 22, the claws 23 and 24 are free, whereas the claw members 26 are in engagement with fixedly arranged claw members 27, whereby the shaft 20 is locked, so that the vehicle is prevented from rolling, for instance in the parking of the same.

It will be seen from the above that the arrangement described involves facilities for forward drive at three different ratios of gear, in addition to which a gearing for backward drive and a locking means for parking purposes are provided.

The plant according to Fig. 2 differs from that illustrated in Fig. 1 only in that the input shaft 1 is connected to the pump wheel 2 as well as to the turbine portion 4 of the torque converter through the intermediary of a differential contrivance in the form of a planet gearing, the pump wheel being connected to the sun wheel 30 of the planet gearing and the turbine 4 to the ring wheel 31 thereof. Here, the shaft 1 is connected to the planet wheel holder 32. Inserted between the sun wheel 30 and the ring wheel 31 is a roller locking device 33.

The arrangement according to Fig. 2 involves that the input torque is divided, inasmuch as the same is in part transmitted directly to the output shaft 6, while the rest of the torque is transmitted to the pump 2.

Finally, Fig. 3 is a diagrammatic representation of the efficiency as a function of the speed in driving under counter rotation, single rotation and direct coupling conditions. As will be seen, the curve rises very rapidly at starting under counter rotation conditions, and after the efficiency has passed its maximum, shifting to single rotation takes place, the efficiency then remaining substantially constant up to a certain speed, at which shifting to direct coupling will be found suitable.

The invention is not limited to the forms of embodiment above described and shown in the drawings, but may be modified in its details within the scope of the following claims. With the use of a claw coupling between the output shaft 6 and the drum 17 and the driving shaft 20, the brake bands 18 and 13 may be used for synchronization at a change of the gearing, but the claw coupling may, if desired, be replaced by a coupling of the friction type. The braking means of band type may obviously be replaced by equivalent means, for instance of the cone or friction coupling type.

What we claim is:

1. A change speed gearing for motor vehicles comprising a hydraulic torque converter having an input shaft and including a pump member driven by said input shaft, a turbine member and a guide member adapted to rotate in opposite directions, said converter having a first output shaft connected to said turbine member and a second output shaft connected to said guide member, a planet gearing including a first sun gear, a second sun gear having the same number of teeth as said first sun gear, planet gears in engagement with both of said sun gears and a ring gear in engagement with said planet gears, said first output shaft being connected to said ring gear and said second output shaft being connected to said first sun gear, a planet gear carrier, a first brake for said carrier, a drive shaft connectible to said first output shaft, a second brake for said second sun gear to hold stationary said sun gears, second output shaft and guide member, said second sun gear being connectible to said drive shaft for effecting rearward motion of the vehicle when said planet gear carrier is held stationary by said first brake and said second brake is disengaged.

2. A change speed gearing according to claim 1 and including a one-way locking means cooperating with a fixed support and operative to prevent said planet gear carrier from rotating in a rearward direction during forward drive when said first and second output shafts are rotating.

3. A change speed gearing according to claim 1 and which further includes a coupling adapted to be thrown in for the purpose of providing direct connection between said input shaft and said drive shaft thereby to by-pass said torque converter and said planet gearing.

References Cited in the file of this patent
UNITED STATES PATENTS

| | | |
|---|---|---|
| 2,162,803 | England | June 20, 1939 |
| 2,316,390 | Biermann | Apr. 13, 1943 |
| 2,383,980 | Lysholm | Sept. 4, 1945 |
| 2,598,501 | Burnett | May 27, 1952 |
| 2,609,708 | Burnett | Sept. 9, 1952 |
| 2,657,592 | Burnett | Nov. 3, 1953 |

UNITED STATES PATENT OFFICE

CERTIFICATE OF CORRECTION

Patent No. 2,905,025 September 22, 1959

Sven-Olof Karlsson, now by change
of name, Sven-Olof Kronogard, et al.

It is hereby certified that error appears in the above numbered patent requiring correction and that the said Letters Patent should read as corrected below.

In the grant, line 1, in the heading to the drawings, Sheets 1 and 2, line 1, in the signature to the drawings, Sheets 1 and 2, and in the heading to the printed specification, line 3, name of first inventor, for "Sven-Olof Karlsson", each occurrence, read -- Sven-Olof Karlsson, now by change of name, Sven-Olof Kronogard --.

Signed and sealed this 31st day of May 1960.

(SEAL)

Attest:

KARL H. AXLINE

Attesting Officer

ROBERT C. WATSON
Commissioner of Patents